(12) United States Patent
Salter et al.

(10) Patent No.: US 10,207,628 B1
(45) Date of Patent: Feb. 19, 2019

(54) VEHICLE LIGHT ASSEMBLIES

(71) Applicant: Ford Global Technologies, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/899,638

(22) Filed: Feb. 20, 2018

(51) Int. Cl.
| | |
|---|---|
| *B60Q 1/04* | (2006.01) |
| *B60Q 1/12* | (2006.01) |
| *B60Q 1/20* | (2006.01) |
| *B60Q 1/46* | (2006.01) |
| *F21S 41/657* | (2018.01) |

(52) U.S. Cl.
CPC ............ *B60Q 1/045* (2013.01); *B60Q 1/12* (2013.01); *B60Q 1/20* (2013.01); *F21S 41/657* (2018.01); *B60Q 1/46* (2013.01); *B60Q 2300/142* (2013.01); *B60Q 2300/312* (2013.01); *B60Q 2300/314* (2013.01); *B60Q 2300/45* (2013.01)

(58) Field of Classification Search
CPC ......... F21S 41/657; B60Q 1/045; B60Q 1/12; B60Q 1/20; B60Q 1/46; B60Q 2300/142; B60Q 2300/312; B60Q 2300/314; B60Q 2300/45

USPC ................................................ 362/523, 526
See application file for complete search history.

(56) References Cited

U.S. PATENT DOCUMENTS

| | | |
|---|---|---|
| 4,831,506 A | 5/1989 | Miyazawa |
| 6,428,187 B1 | 8/2002 | Shin |
| 7,703,954 B2 * | 4/2010 | Kusagaya ............. B60Q 1/076 362/465 |
| 2011/0063866 A1 * | 3/2011 | Shibata ................. B60Q 1/076 362/523 |
| 2011/0305033 A1 * | 12/2011 | Sugiyama ............. B60Q 1/085 362/512 |
| 2012/0147616 A1 * | 6/2012 | Singh ................... B60Q 1/0041 362/507 |
| 2014/0307456 A1 * | 10/2014 | Ishida ................... B60Q 1/115 362/513 |
| 2014/0321132 A1 * | 10/2014 | Shibata ............... B60Q 1/0683 362/460 |

FOREIGN PATENT DOCUMENTS

| | | |
|---|---|---|
| CN | 2880591 | 3/2007 |
| CN | 101666452 | 3/2010 |
| JP | 4816959 | 11/2011 |
| KR | 100583383 | 6/2006 |
| WO | 2005032884 A1 | 4/2005 |

* cited by examiner

Primary Examiner — Laura K Tso
(74) Attorney, Agent, or Firm — Jason Rogers; Price Heneveld LLP (57) ABSTRACT

A vehicle includes a bezel defining a lamp cavity. A lamp assembly includes a base slide coupled with the bezel. A lamp slide is slidably coupled with the base slide. A housing bracket is coupled to the lamp slide and to a lamp housing. An actuator is coupled to the lamp slide and configured to move the lamp housing through the lamp cavity.

19 Claims, 8 Drawing Sheets

VEHICLE LIGHT ASSEMBLIES

FIELD OF THE INVENTION

The present disclosure generally relates to light assemblies, and more particularly to vehicle light assemblies.

BACKGROUND OF THE INVENTION

Vehicles incorporate a variety of light assemblies positioned around the vehicle. Conventional light assembly designs are often a tradeoff of styling concerns and adequate light production. For example, conventional light assembly designs may produce roadway lighting which is partially hampered due to styling concerns (e.g., placement and/or the shape of related components). Accordingly, new lamp assemblies which provide both aesthetic and utilitarian features may be advantageous.

SUMMARY OF THE INVENTION

According to one feature of the present disclosure, a vehicle includes a bezel defining a lamp cavity. A lamp assembly includes a base slide coupled with the bezel. A lamp slide is slidably coupled with the base slide. A housing bracket is coupled to the lamp slide and to a lamp housing. An actuator is coupled to the lamp slide and configured to move the lamp housing through the lamp cavity.

According to another feature of the present disclosure, a vehicle lamp assembly includes a base slide defining a recessed groove. A lamp slide defines a protrusion slidably coupled with the recessed groove of the base slide. A housing bracket is coupled to the lamp slide and to a lamp housing. A solenoid includes an adjuster coupled to the lamp slide. The solenoid is configured to move the adjuster such that the protrusion slides through the recessed groove.

According to yet another feature of the present disclosure, a vehicle lamp assembly includes a base slide defining a recessed groove. A lamp slide defines a protrusion slidably coupled with the recessed groove of the base slide. A housing bracket is coupled to the lamp slide and to a lamp housing. A solenoid includes an adjuster coupled to the lamp slide. The solenoid is configured to move the adjuster such that the protrusion slides through the recessed groove.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Referring now to FIGS. 1-6, depicted is a vehicle 10 including a bezel 14 defining a lamp cavity 18. A lamp assembly 22 includes a base slide 26 which is coupled to the bezel 14. A lamp slide 30 is slidably coupled with the base slide 26. A housing bracket 34 is coupled to the lamp slide 30 and to a lamp housing 38. An actuator 42 is coupled to the lamp slide 30 and configured to move the lamp housing 38 through the lamp cavity 18.

Figure 1:
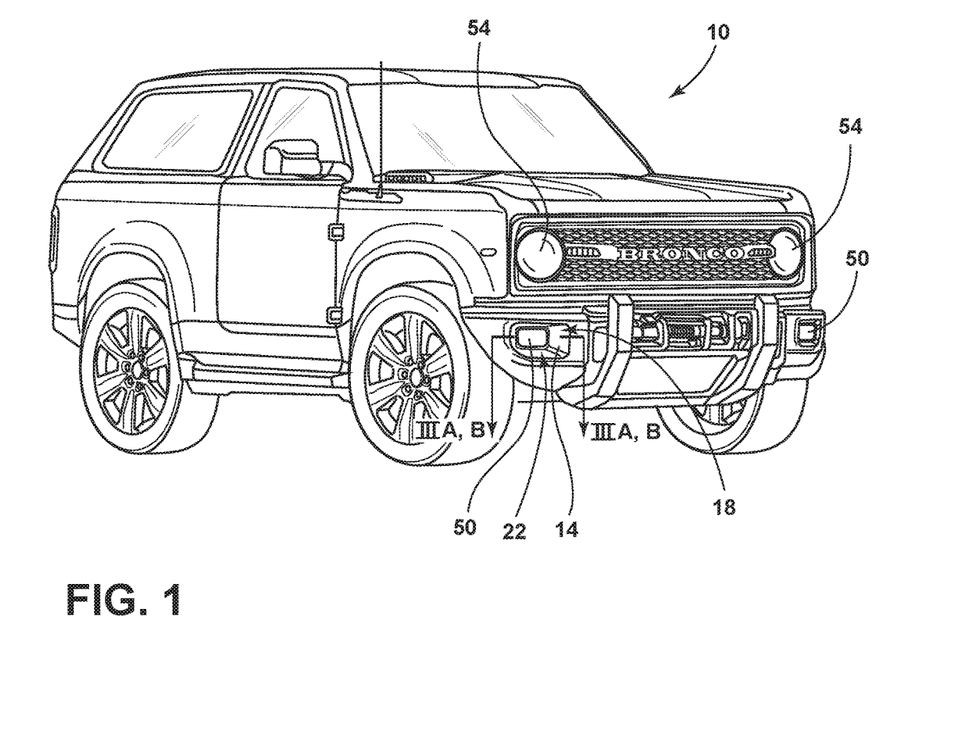
FIG. 1 is a front perspective view of a vehicle, according to at least one example.

Referring now to FIG. 1, the vehicle 10 is depicted as a sport utility vehicle, but it will be understood that the vehicle 10 may be a sedan, van, truck, cross-over or other vehicle 10 without departing from the teachings provided herein. In the depicted example, the lamp assembly 22 is a fog-lamp 50, but it will be understood that the lamp assembly 22 may be a headlight 54, taillight and/or any other lamp assembly 22 positioned around the vehicle 10. Fog-lamps 50 generally provide a wide, bar-shaped beam of light with a sharp cutoff at the top, and are generally aimed and mounted lower on the vehicle 10 as opposed to headlights 54. Fog-lamps 50 may be used for low speed to increase the illumination directed towards a road surface and edges of the road in conditions of poor visibility due to rain, fog and/or dust. As will be explained in greater detail below, the presently disclosed lamp assembly 22 may be operated between extended and retracted positions to provide cornering light.

Figures 2A, 2B:
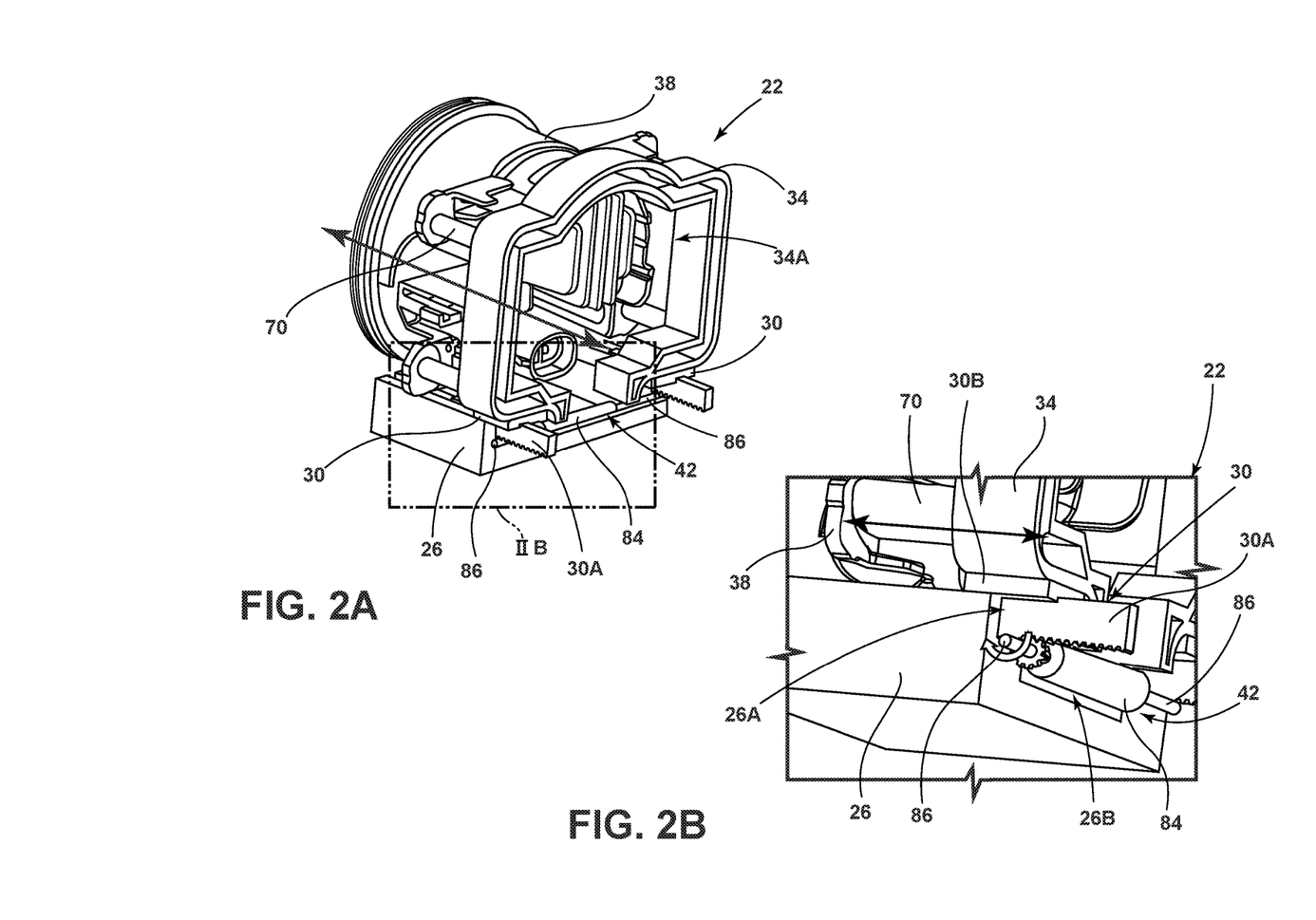
FIG. 2A is a perspective view of a vehicle lamp assembly, according to at least one example.
FIG. 2B is an enhanced view taken at section IIB of FIG. 2A, according to at least example.
Figure 2C:
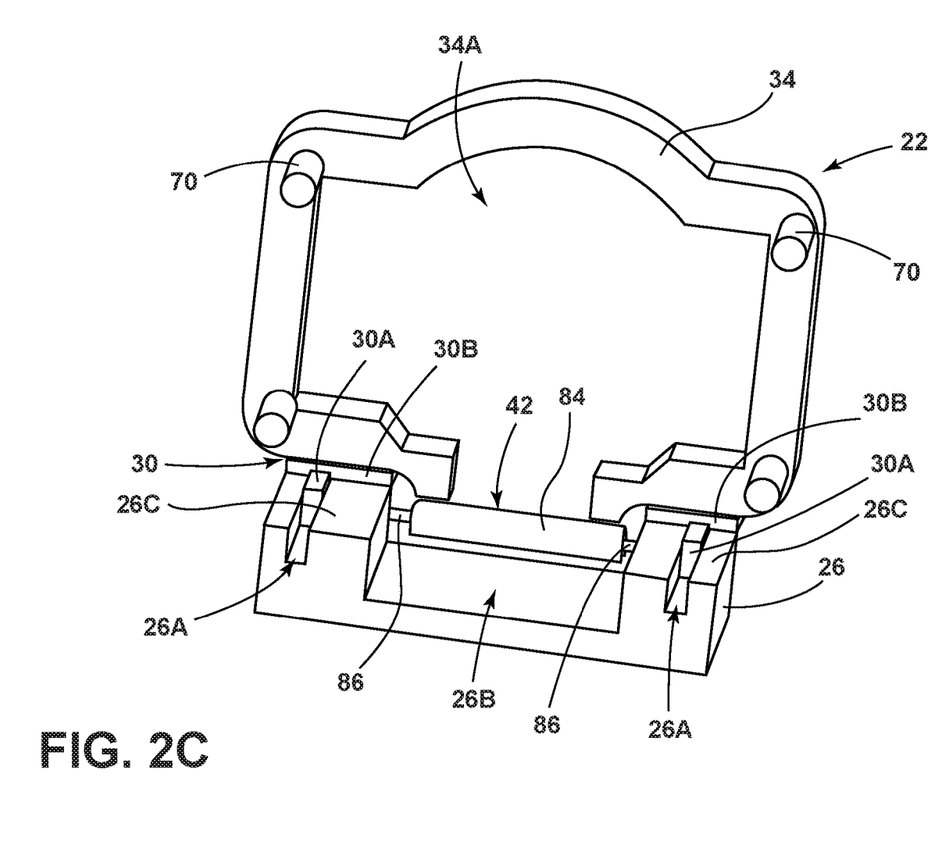
FIG. 2C is a perspective view of the lamp assembly, according to at least one example.

Referring now to FIGS. 2A-2C, the lamp assembly 22 includes the base slide 26, lamp slide 30, the housing bracket 34 and the actuator 42. The base slide 26 is coupled to the bezel 14 (FIG. 1). The base slide 26 is positioned below the lamp housing 38, but it will be understood that the base slide 26 may be positioned on a side and/or on a top of the lamp assembly 22 without departing from the teachings provided herein. The base slide 26 may be composed of a metal, polymer, composite material and/or combinations thereof.

The base slide 26 may define one or more recessed grooves 26A. In the depicted example, the base slide 26 defines two recessed grooves 26A, but it will be understood that the base slide 26 may define a single recessed groove 26A or three or more recessed grooves 26A. The recessed grooves 26A may be generally square or rectangular in cross section, but it will be understood that the recessed grooves 26A may have other cross-sectional shapes including circular, semicircular, oblong, oval, triangular and higher order polygons. The recessed grooves 26A may be polished or otherwise smooth such that the lamp slides 30 may be slidably coupled thereto. In some examples, the recessed grooves 26A may include one or more rollers to help facilitate the slideable coupling of the lamp slides 30 to the base slide 26. In operation, the base slide 26 may remain stationary within the bezel 14, or may move.

According to various examples, the base slide 26 may also define a bracket groove 26B configured to allow portions of the housing bracket 34 to move through the base slide 26. In the depicted example, the bracket groove 26B is a large open area, but it will be understood that the base groove 26B may take any shape to allow the housing bracket 34 to move without being blocked by the base slide 26. The recessed grooves 26A and/or the bracket groove 26B may extend the width of the base slide 26 or only a portion. For example, the recessed grooves 26A and/or the bracket groove 26B may extend about 5% or greater, about 10% or greater, about 20% or greater, about 30% or greater, about 40% or greater, about 50% or greater, about 60% or greater, about 70% or greater, about 80% or greater, about 90% or greater, about 95% or greater, or about 99% or greater or fully across the width of the base slide 26. It will be understood that each of the recessed grooves 26A and/or the bracket groove 26B may have a different length through the width of the base slide 26.

The base slide 26 defines a slide surface 26C into which the recessed grooves 26A and the bracket groove 26B are defined. The slide surface 26C may function to at least partially support the lamp slides 30, bracket 34 and/or lamp housing 38. The slide surface 26C may be polished or otherwise smooth to facilitate low resistance sliding of the lamp slides 30 and/or housing bracket 34 across or over the base slide 26.

The lamp slides 30 are coupled between the base slide 26 and the lamp housing 38 and/or the housing bracket 34. In the depicted example, the lamp assembly 22 includes two lamp slides 30, but it will be understood that the lamp assembly 22 may include a single lamp slide 30 or three or greater lamp slides 30. In the depicted example, the lamp assembly 22 includes a first lamp slide 30 and a second lamp slide 30. In examples where there is only a single lamp slide 30, the base slide 26 may define a single recessed groove 26A or a single lamp slide 30 may extend across the slide surface 26C and couple with multiple recessed grooves 26A. The lamp slides 30 may be composed of a metal, a polymer, a composite material and/or combination thereof.

The lamp slides 30 may generally have a "T" shape and as such may be known as "T slides." The lamp slides 30 may each define a protrusion 30A extending from a slide body 30B. The protrusions 30A extend outwardly from the slide body 30B in a downwardly manner. The protrusions 30A may have a length sufficient to fully fill the recessed grooves 26A or the protrusion may be shorter. For example, one or more of the protrusions 30A may fill about 5% or greater, about 10% or greater, about 20% or greater, about 30% or greater, about 40% or greater, about 50% or greater, about 60% or greater, about 70% or greater, about 80% or greater, about 90% or greater, about 95% or greater, or about 99% or greater or fully fill the recessed grooves 26A. The protrusions 30A may have a cross-sectional shape similar to the recessed grooves 26A or the cross-sectional shape may be different. For example, one or more of the protrusions 30A may have a generally circular, oblong, oval, semicircular, triangular, square, rectangular or higher-order polygon shapes. It will be understood that each of the protrusions 30A may differ in cross-sectional shape, length, width or other features without departing from the teachings provided herein.

In operation, the base slide 26 and the lamp slides 30 are configured to be slidably coupled through the protrusions 30A and the recessed grooves 26A. The recessed grooves 26A are configured to accept the protrusions 30A such that the recessed grooves 26A function as a track for the protrusions 30A to be guided on. In other words, as the protrusions 30A are positioned within the recessed grooves 26A, the lamp slides 30 are guided in moving across the base slide 26.

The housing bracket 34 is coupled to the lamp slides 30 and the lamp housing 38. In examples where there are a plurality of lamp slides 30, the housing bracket 34 may be coupled to a single lamp slide 30 or a plurality of lamp slides 30. In the depicted example, the housing bracket 34 is coupled to both of the lamp slides 30. The housing bracket 34 is positioned vehicle rearward of the lamp housing 38, but it will be understood that the housing bracket 34 may be positioned on a side and/or on a top of the lamp assembly 22 without departing from the teachings provided herein. Further, the housing bracket 34 is positioned vehicle forward of the lamp housing 38 or vehicle forward of a portion of the lamp housing 38. According to various examples, the housing bracket 34 is positioned above the lamp slides 30 and the base slide 26. The housing bracket 34 may be composed of a metal, polymer, composite material and/or combinations thereof.

The housing bracket 34 defines a bracket aperture 34A. The bracket aperture 34A may have a width which is greater than a housing width of the lamp housing 38. In other words, the bracket aperture 34A is sufficiently wide enough to allow the lamp housing 38 to be positioned within the housing bracket 34. Similarly, the bracket aperture 34A may have a height which is greater than a housing height of the lamp housing 38 such that the lamp housing 38 may be positioned within the housing bracket 34. The bracket aperture 34A which is defined by the housing bracket 34 may have a generally semicircular, circular, oval, oblong, triangular, square, rectangular or higher-order polygon shape. The housing bracket 34 may be a solid continuous structure or may be an open structure such that ends of the housing bracket 34 do not touch one another. It will be understood that the housing bracket 34 may not define the bracket aperture 34A such that the housing bracket 34 is a solid structure onto which the lamp housing 38 couples.

According to various examples, the housing bracket 34 may include one or more attachment posts 70 which are configured to couple the housing bracket 34 to the lamp housing 38. The housing bracket 34 may include a single attachment post 70, or a plurality of attachment posts 70 positioned around of the housing bracket 34. The attachment posts 70 may be integrally defined by the housing bracket 34 or may be a separate component adhered thereto. The attachment posts 70 may be composed of a metal, a polymer, composite material and/or combinations thereof. In the depicted example, the attachment posts 70 extend in a generally vehicle forward direction to couple with the lamp housing 38, it will be understood that the attachment posts 70 extend in a vehicle rearward direction to couple with the lamp housing 38 and different configurations of the lamp assembly 22.

Referring now to FIGS. 2A-3B, the lamp housing 38 is coupled to the housing bracket 34 through the attachment posts 70. The lamp housing 38 is configured to retain, or hold, a lens 78 and a light source 82. In other words, the lamp housing 38 is coupled with the light source 82 and the lens 78. The lamp housing 38 may be composed of a metal, a polymer, a composite material and/or combinations thereof. The coupling of the lamp housing 38 and the housing bracket 34 through the attachment posts 70 allows the lamp housing 38 to be supported by the housing bracket 34 as well as allowing the lamp housing 28 to move, as will be explained in greater detail below. The lamp housing 38 may include a reflector such that light (e.g., visible light having a wavelength of from about 400 nm to about 700 nm) generated by the light source 82 is reflected in a vehicle forward direction through the lens 78. The light source 82 may be a light-emitting diode, a halogen bulb, an incandescent bulb, a high-intensity discharge bulb and/or combinations thereof.

Figure 3A:
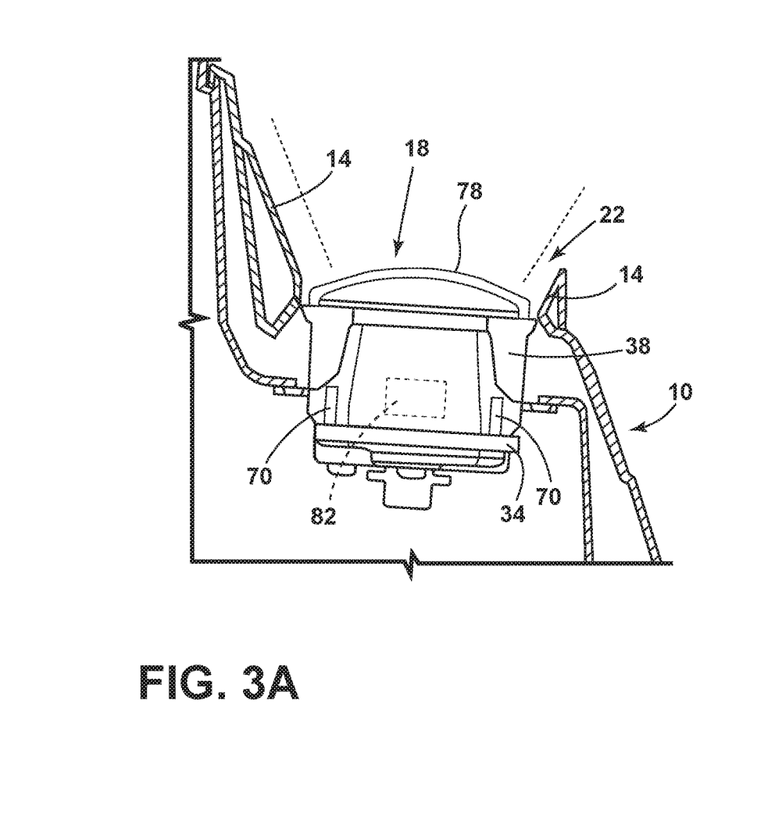
FIG. 3A is a cross-sectional view taken at line IIIA-IIIA of FIG. 1 with the vehicle lamp assembly in a retracted position, according to at least one example.
Figure 3B:
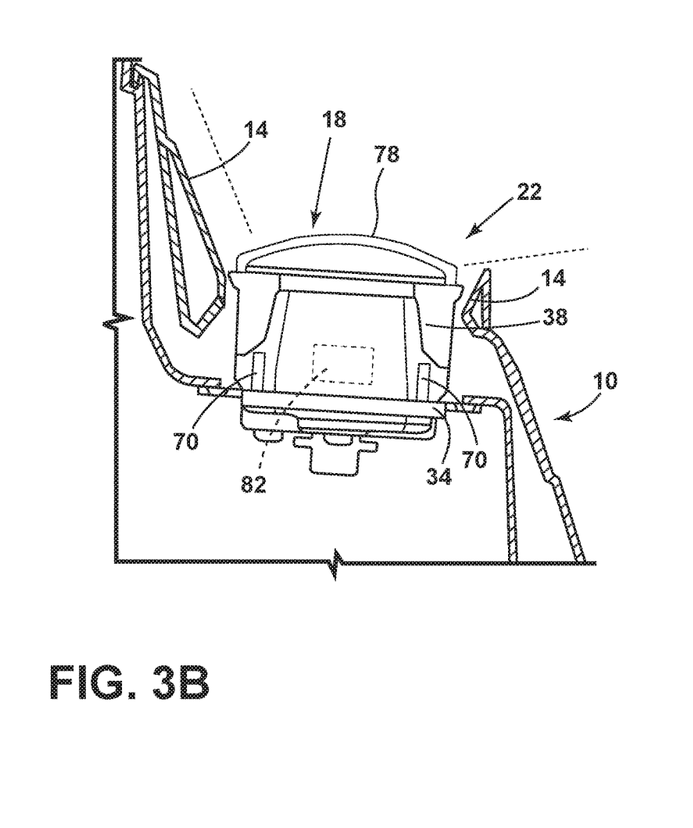
FIG. 3B is a cross-sectional view taken at line IIIB-IIIB of FIG. 1 with the vehicle lamp assembly in an extended position, according to at least one example.

The lens 78 may be composed of a substantially transparent material. For example, the lens 78 may be composed of a polymeric material, a glass and/or combinations thereof. The lens 78 is positioned on a vehicle forward side of the lamp housing 38 and allows light generated by the light source 82 to exit and illuminate a space in front of the vehicle 10. In other words, the lens 78 is positioned vehicle forward of the lamp housing 38. The lens 78 may define one or more optical lens configured to collimate and/or shape the light emitted from the light source 82.

The lamp assembly 22 includes one or more actuators 42. In the depicted examples, the actuator 42 includes a solenoid 84 and two adjusters 86, but it will be understood that the actuator 42 may take a variety of configurations. For example, the actuator 42 may operate through hydraulic, pneumatic, electric and/or mechanical force. In the depicted examples, the actuator 42 is positioned vehicle rearward of the base slide 26, but it will be understood that the actuator 42 may be positioned in a variety of locations around the lamp assembly 22. In operation, the solenoid 84 is configured to rotationally move the adjusters 86 in both clockwise and counterclockwise directions. The adjusters 86 are coupled to the protrusions 30A of the lamp slides 30. In the depicted example, each of the adjusters 86 is coupled to one of the lamp slides 30 through the protrusions 30A. According to various examples, the adjusters 86 and the protrusions 30A each define a set of teeth which intermesh such that rotational motion of the adjusters 86 is translated into linear motion of the lamp slides 30 in a vehicle forward and rearward direction. In other words, the adjusters 86 and the lamp slides 30 each define a row of teeth (e.g., on the protrusions 30A of the lamp slides 30) coupled with one another. It will be understood that a variety of configurations of the actuator 42 and the lamp slides 30 are contemplated. For example, the lamp assembly 22 may include a plurality of actuators 42, each configured to drive a separate or the same lamp slide 30. Further, the solenoid 84 may be configured to apply a linear motion to the adjuster(s) 86 such that the linear motion of the adjusters is translated into linear motion of the lamp slides 30. The motion provided by the solenoid 84 is configured to move the adjusters 86 such that the protrusion 30A slides through the recessed groove 26A of the base slide 26.

In operation, the movement provided by the actuator 42 is configured to move the lens 78 vehicle forward of a portion of the bezel 14. As explained above, styling concerns often result in the fog lamps 50 being recessed within fascia. As the actuator 42 is configured to drive the adjusters 86 and the protrusions 30A though the recessed grooves 26A, the coupling of the lamp slides 30 to the housing bracket 34 and the lamp housing 38 results in the lens 78 of the lamp housing 38 moving into and out of the lamp cavity 18 which is defined by the bezel 14. Such moving of the adjusters 86 and the protrusions 30A by the solenoid 84 is configured to move the lamp housing 38 over the base slide 26. Such motion of the actuator 42 allows the lamp housing 38 to "telescope" through the lamp cavity 18 defined by the bezel 14.

The motion provided to the lamp assembly 22 by the actuator 42 is configured to allow the lens 78 and/or lamp housing 38 to protrude in front of portions of the bezel 14 in an extended position (e.g., FIG. 3B) and withdraw into a retracted position (e.g., FIG. 3A) vehicle rearward of portions of the bezel 14. The lens 78 may move, or be translated in a vehicle forward or rearward direction, about 0.1 mm or greater, about 0.2 mm or greater, about 0.3 mm or greater, about 0.4 mm or greater, about 0.5 mm or greater, about 0.6 mm or greater, about 0.7 mm or greater, about 0.8 mm or greater, about 0.9 mm or greater, about 1 mm or greater, about 2 mm or greater, about 3 mm or greater, about 4 mm or greater, about 5 mm or greater, about 6 mm or greater, about 7 mm or greater, about 8 mm or greater, about 9 mm or greater, about 10 mm or greater or any and all values and ranges therebetween.

Figure 4A:
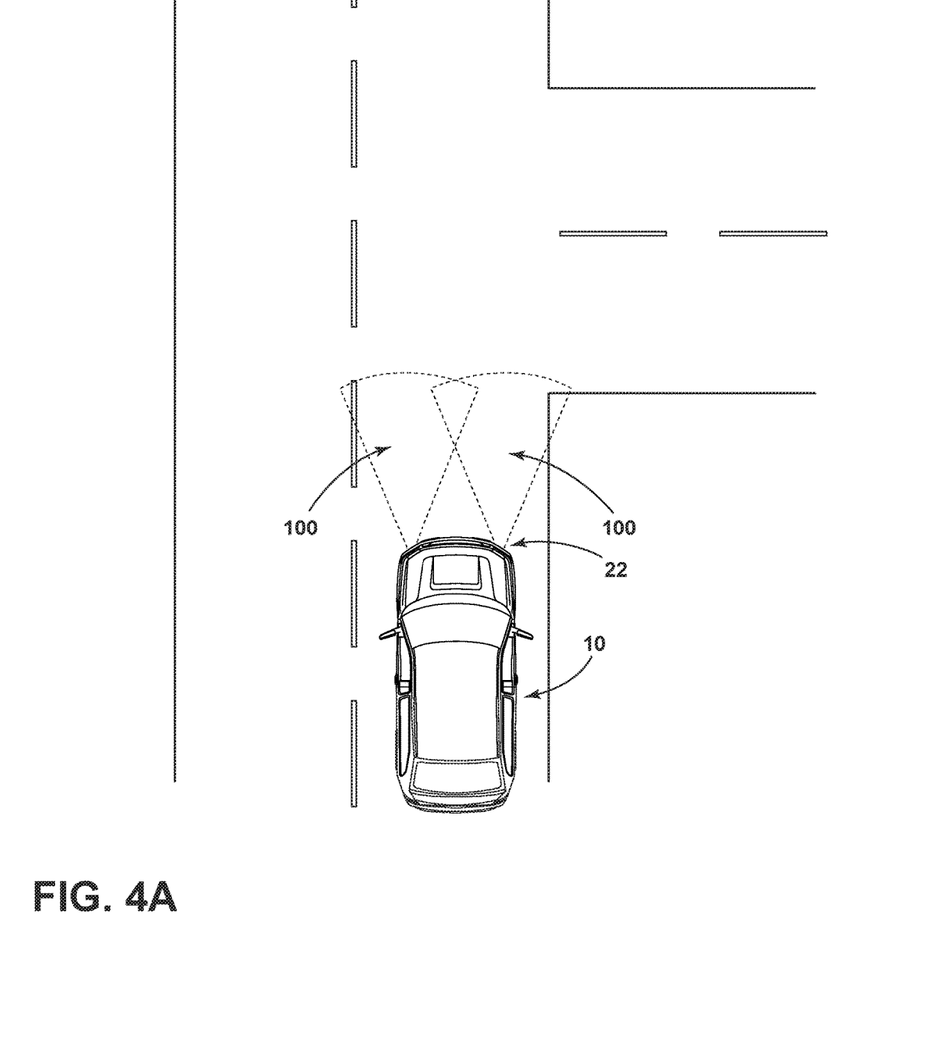
FIG. 4A is a top view of the vehicle having a first beam pattern while the lamp assembly is in the retracted position, according to at least one example.
Figure 4B:
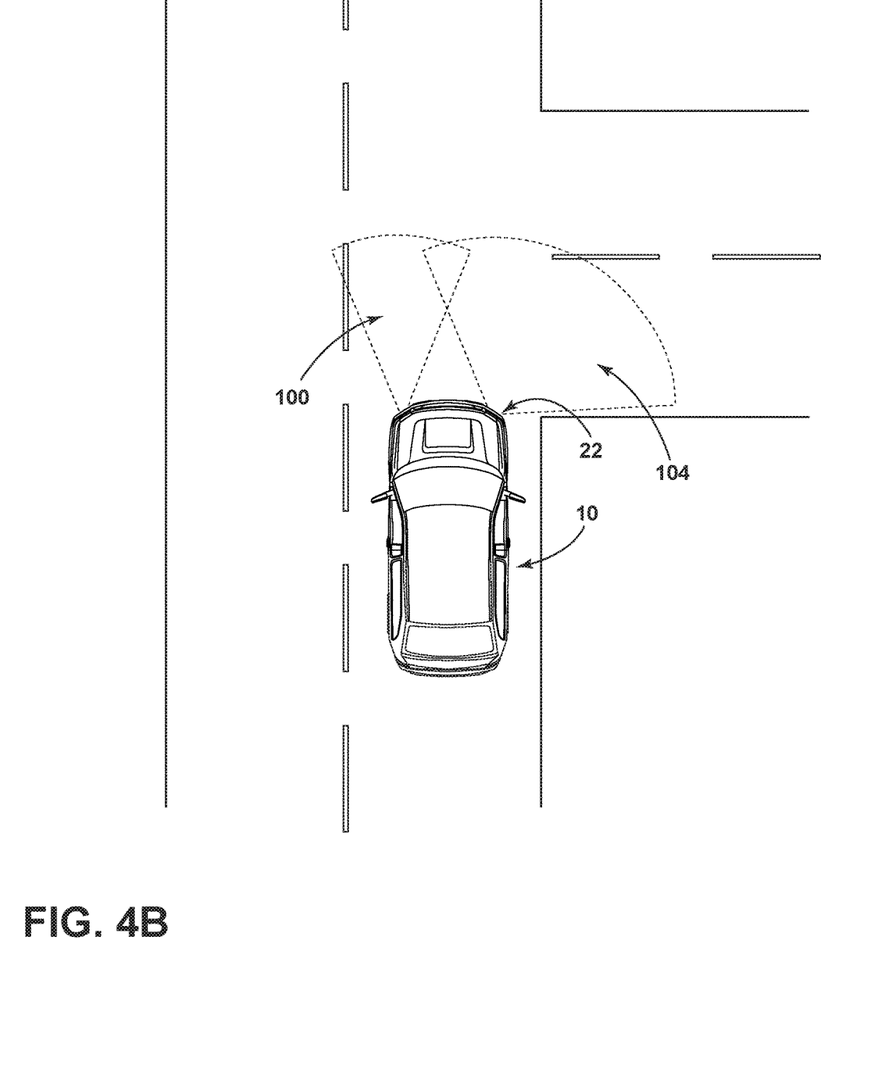
FIG. 4B is a top view of the vehicle having a second beam pattern while the lamp assembly is in the extended position, according to at least one example.

Use of the present disclosure may allow the lamp assemblies 22 to provide both a first lighting pattern 100 and a second lighting pattern 104 (FIG. 4B). When the lamp assembly 22 is in the retracted position (FIG. 3A), light emitted from the lamp assembly 22 is projected from the vehicle 10 in a first light pattern 100. The first light pattern 100 may generally extend in an outward direction from the front of the vehicle 10 in a generally cone pattern. As the actuator 42 moves the lamp assembly 22 to the extended position such that the lens 78 extends into the lamp cavity 18 and extends in front of at least a portion of the bezel 14, the light emitted from the lamp assembly 22 may take the second lighting pattern 104 and extend to a side of the vehicle 10. For example, as the lens 78 moves vehicle forward of the bezel 14, light may escape the lamp cavity 18 and toward of the side of the vehicle 10 thereby illuminating regions to the side of the vehicle 10. As such, the second lighting pattern 104 may be known or referred to as cornering light as light from the lamp assembly 22 may illuminate a path taken by the vehicle 10 as it turns a corner. It will be understood that in instances where the vehicle 10 includes a plurality of lamp assemblies 22, each of the lamp assemblies 22 may be operated individually to produce the first and/or second illumination patterns 100, 104.

Figure 5:
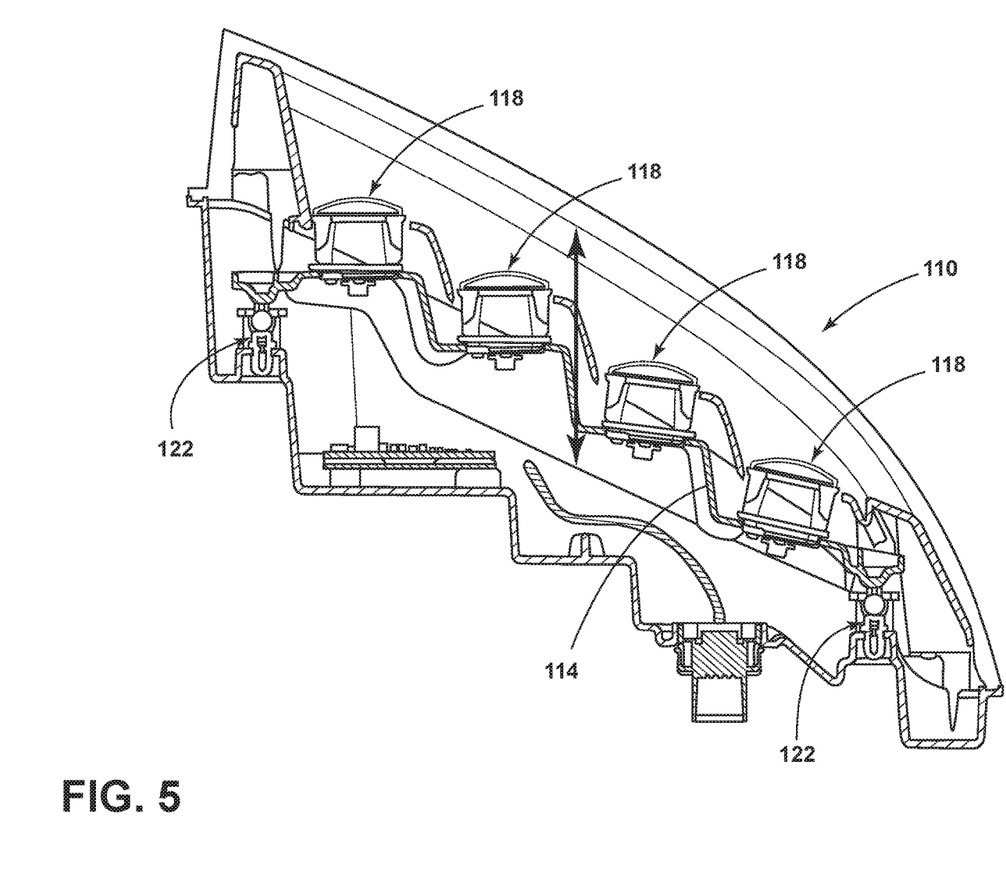
FIG. 5 is a cross-sectional view of the lamp assembly, according to at least one example.

Referring now to FIG. 5, depicted is an alternate example of the lamp assembly 22 shown as 110. The lamp assembly 110 may operate in a similar manner to the lamp assembly 22, but rather than include the base slide 26 (FIG. 2) and lamp slide 30 (FIG. 3A), the lamp assembly 110 includes a substrate 114 on which a plurality of individual lights 118 are positioned. The substrate 114 is configured to move in a vehicle forward and vehicle rearward direction through the use of motors 122 positioned at each end of the substrate 114. It will be understood that in various examples, each of the lights 118 may be independently movable to achieve the same and/or similar effect. By moving the substrate 114 and/or lights 118 in a vehicle forward and rearward direction, the first and second light patterns 100, 104 (FIG. 4B) may be achieved.

Figure 6:
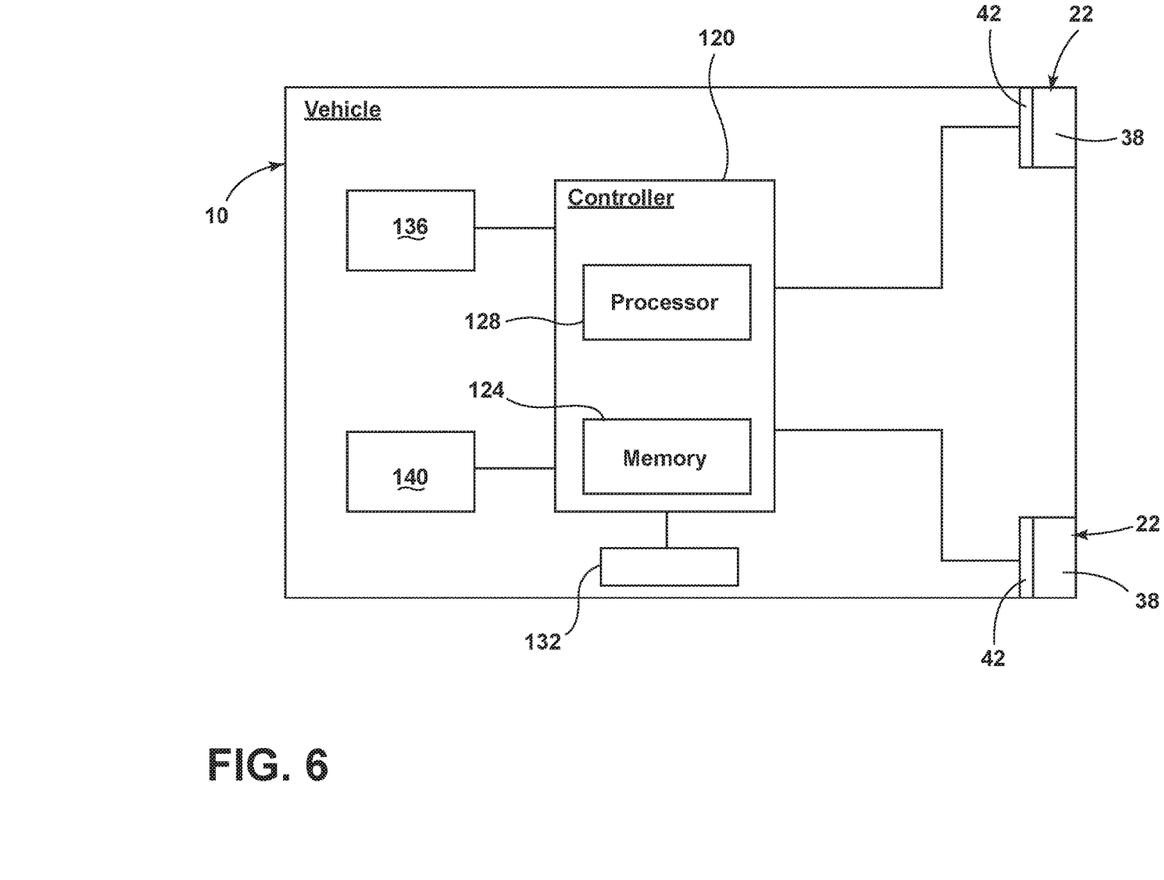
FIG. 6 is a schematic view of the vehicle, according to at least one example.

Referring now to FIG. 6, a block diagram of the vehicle 10 is shown in which the lamp assemblies 22 are included. The vehicle 10 includes a controller 120 in communication with the lamp assemblies 22. The controller 120 may include a memory 124 having instructions contained therein that are executed by a processor 128 of the controller 120. The controller 120 may provide electrical power to lamp assemblies 22 via a power source 132 located onboard the vehicle 10. In addition, the controller 120 may be configured to control the actuator 42 of the lamp assemblies 22 based on feedback received from one or more vehicle control modules. For example, the vehicle control modules may include a steering sensor 136 and a vehicle sensor 140. The controller 120 may be configured to activate one or more of the actuators 42 based on the signals received from the vehicle control modules. For example, if the steering sensor 136 determines that a steering wheel of the vehicle 10 is being moved consistent with the vehicle 10 turning, the controller 120 may move one or more of the lamp assemblies 22 to the extended position such that the second light pattern 104, or cornering light, is activated. Additionally or alternatively, if the vehicle sensor 140 detects a turn is imminent (e.g., from a navigation system, turn signal) or detects an object of interest (e.g., person, animal, etc.) present to the side of the vehicle 10 while it is moving, the controller 120 may activate the actuator 42 to move the corresponding lamp assembly 22 to the extended position such that the second light pattern 104 illuminates the turn or object of interest. Once the controller 120 detects that the turn has been completed or the object of interest has passed, the controller 120 may activate the actuator 42 to move the lamp housing 38 to lamp assembly 22 to the retracted position such that the first light pattern 100 is created. According to various examples, the controller 120 may control the actuators 42 to move one or more of the lamp assemblies 22 to the extended position and flash an amber color from the light sources 82 when a hazard mode is initiated. According to various examples, the controller 120 may control the actuators 42 to move one or more of the lamp assemblies 22 to the extended position to provide increased illumination during parking maneuvers such as parallel parking. According to various examples, the controller 120 may control the actuators 42 to move one or more of the lamp assemblies 22 to the extended position and provide amber light in low visibility conditions (e.g., rain as sensed by windshield wipers, fog, dust) to provide heightened side marker visibility. According to various examples, drivers of the vehicle 10 may also manually activate the lamp assemblies 22 to the extended position to provide increased aesthetic or functional lighting. It will be understood that the controller 120 may control the lamp assembly 110 in a substantially similar manner to that described in connection with the lamp assembly 22.

Use of the present disclosure may offer a variety of advantages. First, use of the presently disclosed lamp assemblies 22 may allow both aesthetically pleasing styling (e.g., recessing of the lamp assemblies within the bezel 14) while also providing illumination to the side of the vehicle 10 when necessary. Second, as the presently disclosed lamp assemblies 22 are a more robust design as compared to conventional lights, increased durability of the lamp assemblies 22 may be achieved.

According to various embodiments, a vehicle includes a bezel defining a lamp cavity and a lamp assembly including a base slide coupled with the bezel, a lamp slide slidably coupled with the base slide, a housing bracket coupled to the lamp slide and to a lamp housing, and an actuator coupled to the lamp slide and configured to move the lamp housing through the lamp cavity. Embodiments of the vehicle can include any one or a combination of the following features:

the base slide is positioned below the lamp housing;

the lamp slide is coupled between the base slide and the lamp housing;
the lamp assembly comprises two lamp slides slidably coupled to the base slide;
the housing bracket is coupled to both of the lamp slides;
the actuator is positioned vehicle rearward of the base slide;
a light source and a lens are coupled to the lamp housing;
the actuator is configured to move the lens vehicle forward of a portion of the bezel;
the lamp assembly is a fog light;
a plurality of attachment posts couple the bracket to the lamp housing;
the solenoid is configured to move the lamp housing over the base slide;
a second lamp slide, wherein the solenoid comprises two adjusters, wherein each of the adjusters is coupled to one of the lamp slides; and/or
the adjuster and the lamp slide each define a row of teeth coupled with one another.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

What is claimed is:

1. A vehicle comprising:
a bezel defining a lamp cavity; and
a lamp assembly comprising:
a base slide coupled with the bezel, wherein the base slide defines a recessed groove;
a lamp slide slidably coupled with the recessed groove;
a housing bracket coupled to the lamp slide and to a lamp housing; and
an adjuster coupled to the lamp slide through a row of teeth and configured to move the lamp housing through the lamp cavity.

2. The vehicle of claim 1, wherein the base slide is positioned below the lamp housing.

3. The vehicle of claim 2, wherein the lamp slide is coupled between the base slide and the lamp housing.

4. The vehicle of claim 1, wherein the lamp assembly comprises two lamp slides slidably coupled to the base slide.

5. The vehicle of claim 4, wherein the housing bracket is coupled to both of the lamp slides.

6. The vehicle of claim 1, wherein the adjuster is positioned vehicle rearward of the base slide.

7. The vehicle of claim 1, wherein a light source and a lens are coupled to the lamp housing.

8. The vehicle of claim 7, wherein the adjuster is configured to move the lens vehicle forward of a portion of the bezel.

9. The vehicle of claim 1, wherein the lamp assembly is a fog light.

10. A vehicle lamp assembly comprising:
a base slide defining a recessed groove;
a lamp slide defining a protrusion slidably coupled with the recessed groove of the base slide;
a housing bracket coupled to the lamp slide and to a lamp housing; and
a solenoid comprising an adjuster coupled to the lamp slide, wherein the solenoid is configured to move the adjuster such that the protrusion slides through the recessed groove.

11. The vehicle lamp assembly of claim 10, wherein a plurality of attachment posts couple the housing bracket to the lamp housing.

12. The vehicle lamp assembly of claim 10, wherein the solenoid is configured to move the lamp housing over the base slide.

13. The vehicle lamp assembly of claim 10, further comprising:
a second lamp slide, wherein the solenoid comprises two adjusters, wherein each of the adjusters is coupled to one of the lamp slides.

14. The vehicle lamp assembly of claim 10, wherein the adjuster and the lamp slide each define a row of teeth coupled with one another.

15. A vehicle lamp assembly comprising:
a base slide defining a recessed groove;
a lamp slide defining a protrusion slidably coupled with the recessed groove of the base slide;
a housing bracket coupled to the lamp slide and to a lamp housing, wherein the lamp slide is coupled between the base slide and the lamp housing; and
a solenoid comprising an adjuster coupled to the lamp slide, wherein the solenoid is configured to move the adjuster such that the protrusion slides through the recessed groove.

16. The vehicle lamp assembly of claim 15, wherein the lamp assembly defines a bracket aperture.

17. The vehicle lamp assembly of claim 16, wherein the bracket aperture has an aperture width greater than a housing width of the lamp housing.

18. The vehicle lamp assembly of claim 15, wherein a plurality of attachment posts couple the housing bracket to the lamp housing.

19. The vehicle lamp assembly of claim 15, wherein the solenoid is configured to move the lamp housing over the base slide.

* * * * *